(12) United States Patent
Yovichin et al.

(10) Patent No.: US 6,482,282 B1
(45) Date of Patent: Nov. 19, 2002

(54) METHOD FOR STORAGE, HANDLING AND APPLICATION OF PRECURED TIRE INNERLINERS

(75) Inventors: Albert James Yovichin, Copley; Thomas Reed Oare, Suffield, both of OH (US); Shawn Derrick Knox, Glencoe, AL (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/787,584

(22) PCT Filed: Oct. 23, 1998

(86) PCT No.: PCT/US98/22571

§ 371 (c)(1),
(2), (4) Date: Mar. 19, 2001

(87) PCT Pub. No.: WO00/24569

PCT Pub. Date: May 4, 2000

(51) Int. Cl.[7] .............................................. B29D 30/00
(52) U.S. Cl. ..................... 156/126; 156/133; 156/405.1
(58) Field of Search ............................. 156/110.1, 118, 156/123, 126, 133, 111, 130.7, 405.1, 406.4; 492/43, 49

(56) References Cited

U.S. PATENT DOCUMENTS

| | | | |
|---|---|---|---|
| 1,725,882 A | * 8/1929 | Prigge | 152/318 |
| 3,143,449 A | 8/1964 | Bosomworth et al. | 156/126 |
| 4,166,883 A | 9/1979 | Seiberling | 428/495 |
| 4,221,253 A | 9/1980 | Seiberling | 152/330 R |
| 4,595,448 A | * 6/1986 | Sorioka | 156/396 |
| 4,824,001 A | 4/1989 | Mick, Jr. et al. | 156/64 |
| 4,874,443 A | 10/1989 | Kipling | 156/64 |
| 4,902,372 A | 2/1990 | Mick, Jr. et al. | 156/361 |
| 5,351,698 A | 10/1994 | Wheeler et al. | 128/844 |
| 5,509,891 A | * 4/1996 | DeRidder | 600/39 |

FOREIGN PATENT DOCUMENTS

| | | |
|---|---|---|
| NL | 45812 | 12/1938 |
| NL | 6611487 | 2/1967 |

* cited by examiner

*Primary Examiner*—Geoffrey L. Knable
(74) *Attorney, Agent, or Firm*—David L. King

(57) ABSTRACT

A method of preparing a cylindrical-shaped innerliner (10) for storage. The method involves converting the innerliner (10) from a cylinder into a solid torodially-shaped donut (10A).

5 Claims, 6 Drawing Sheets

METHOD FOR STORAGE, HANDLING AND APPLICATION OF PRECURED TIRE INNERLINERS

RELATED APPLICATIONS

This application is related to International Application Ser. No. PCT/US97/04859 entitled PNEUMATIC TIRES WITH VULCANIZED INNERLINER AND METHOD FOR UTILIZING INNERLINER, filed Mar. 25, 1997 having a common assignor with the present application and is further related to International Application Ser. No. PCT/US97/23,005 entitled METHOD AND APPARATUS FOR BUILDING PNEUMATIC TIRES IN AN IMPROVED TIRE MOLD.

TECHNICAL FIELD

The present invention relates to an improved method of storing tire innerliners. More particularly, the present invention relates to a vulcanized innerliner and the utilization of the vulcanized innerliner in the manufacture of original and retreaded tires. More specifically, to a unique method of storing such innerliners.

BACKGROUND OF THE INVENTION

The tire industry has tried to eliminate the need for curing bladders used in the production of original tires for years. For example, U.S. Pat. No. 3,143,449 discloses a splice-free unvulcanized barrel-shaped innerliner for completely sealing the inside of a green tire against the escape of pressurized fluid into the tire body during the vulcanization operation in an entire vulcanizing mold. In U.S. Pat. No. 4,166,883 ('883) a method of retreading tires with room temperature gas or water instead of a typical use of an inflatable curing bladder is disclosed. The '883 patent also disclosed a partially cured or completely cured innerliner that has its ends joined by a bevel spliced or secured with a locking strip of uncured or partially cured stock across the two ends end-butted together as is conventionally done in new tire construction. The inclusion of a partially cured, or completely cured innerliner also allowed for the molding and forming of a green tire by injecting steam or hot water directly against the inner toroidally-shaped surface of the green tire, i.e. the surface formed by the innerliner, to expand the green tire into the mold walls to mold the tire and then cure vulcanize the tire. The two related ways of preparing a spliceless prevulcanize or partially vulcanize innerliner were disclosed in the related applications above. In those applications, a spliceless but partially cured or totally cured innerliner was constructed. The innerliner had a somewhat cylindrical shape in its manufacture in one preferred embodiment. The cylindrical shaped innerliner had a contoured interior surface that upon insertion into a tire would upon expansion stretch to a rather uniform thickness.

It is apparent that there was a need to provide an improved method of storing such components so that they are not damaged during normal storage and that they are maintained in a relatively compact, yet clean environment.

OBJECTS AND SUMMARY OF THE INVENTION

It is an object of the present invention to provide an elastomeric innerliner (10) for pneumatic tires (1) that can be compactly stored up until the time of use. It is also an object of the present invention to provide an at least partially cured elastomeric innerliner (10) which has the surfaces that will contact the tire (1) upon assemble maintained in a very clean environment.

It is a further object of the invention to maintain the innerliner (10) in its as-stored condition as soon as possible from the time it is manufactured. It is an additional object of the present invention to minimize the amount of outgasing or exposure to oxidization that can occur as a result of storage.

In accordance with the preferred embodiment of the invention, the innerliner (10) is constructed in a cylindrical shape. The splice-free, vulcanized or partially vulcanized innerliner (10) of the present invention is first mounted onto a tire building drum (5) followed by the remainder of tire components needed to form a completed, uncured tire assembly (1). Prior to being sent to a tire building drum (5), the innerliner (10) after being manufactured in a spliceless cylindrical shape is preferably converted into a solid toroidal shape (10A) for storage as disclosed below.

The method of preparing an innerliner (10) for storage and subsequent use in the manufacture of a tire (1), the innerliner (10) having a cylindrical shape having a first end (2) and a second end (4) and a radially inner surface (44) and a radially outer surface, comprises the steps of rotating the first end (2) upon itself and continuing the rotation spirally traversing to the second end (4), thereby forming a solid toroidal shape having a portion of the radially inner surface (44) exposed.

When ready for manufacturing the tire (1), the toroidally-shaped innerliner (10A) is placed over a cylindrical building drum, and by clamping the second end (4) while unrolling the innerliner (10) to the first end (2), the innerliner (10) is returned to a cylindrical shape with the radially inner surface (44) inward of the radially outer surface (42).

In an alternative embodiment when using a green spliceless innerliner or uncured innerliner or a partially cured innerliner (10), it may be preferable to add a separation liner (6) to the innerliner's radially outer surface (42) prior to rotating the first end (2). The method of manufacturing the innerliner (10) may further include the step of curing or partially curing the innerliner prior to forming the toroidal shape (10A).

DEFINITIONS

"Retreaded tire" is a vulcanized tire carcass with a new tire tread.

"Cured tire" is a completely vulcanized tire. "Green tire" is an unvulcanized, completely assembled tire with a preponderance of components being unvulcanized.

"Curing" is the vulcanization process.

"Partially cured innerliner" is vulcanized to at least render the innerliner impervious to pressurized steam gas or hot liquid.

"Innerliner", as used herein, means a layer or layers of material used to create an impervious to pressurize steam gas or hot liquid membrane.

DETAILED DESCRIPTION OF THE INVENTION

Figure 1:
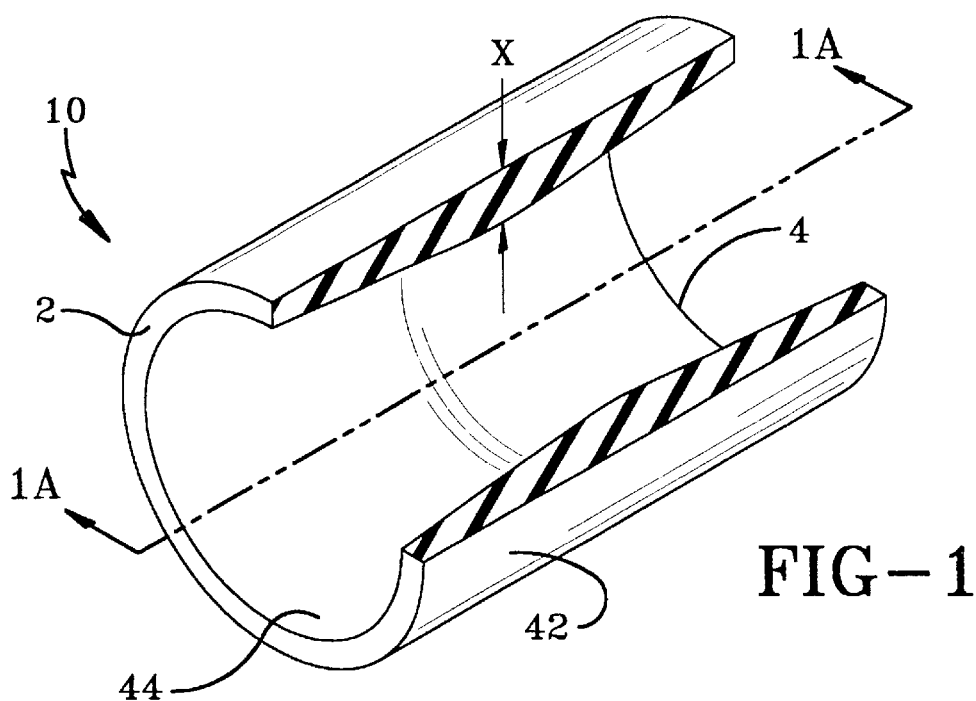
FIG. 1 is a perspective view of the cylindrical shape, splice-free, uncured, at least partially cured or totally vulcanized innerliner (10) of the present invention.
Figure 1A:
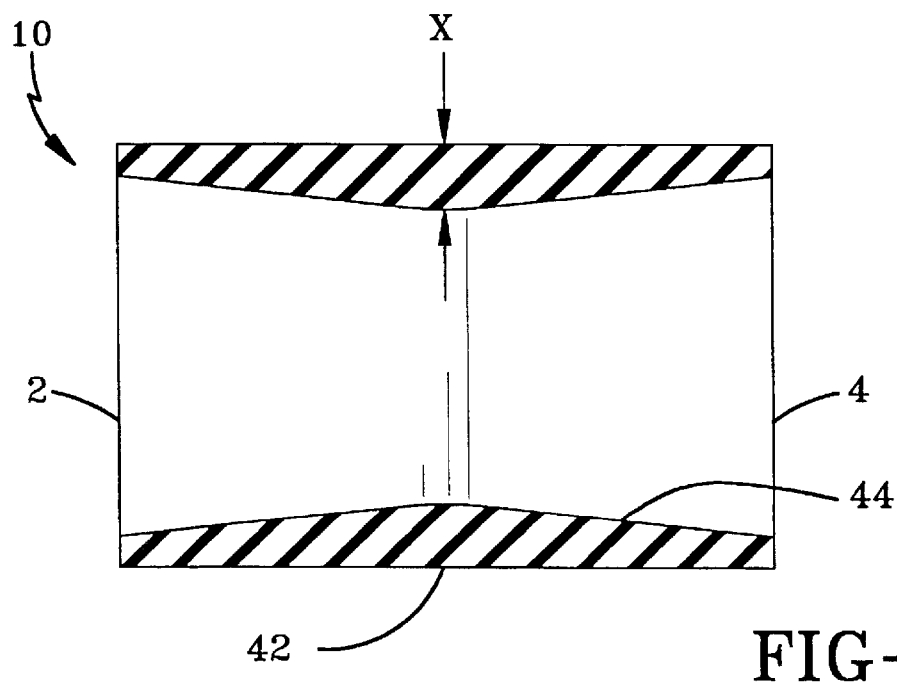
FIG. 1a is a cross-sectional view through line 1a—1a of FIG. 1 showing a side view of the splice-free cylindrical shape innerliner (10) of the invention.
Figure 2:
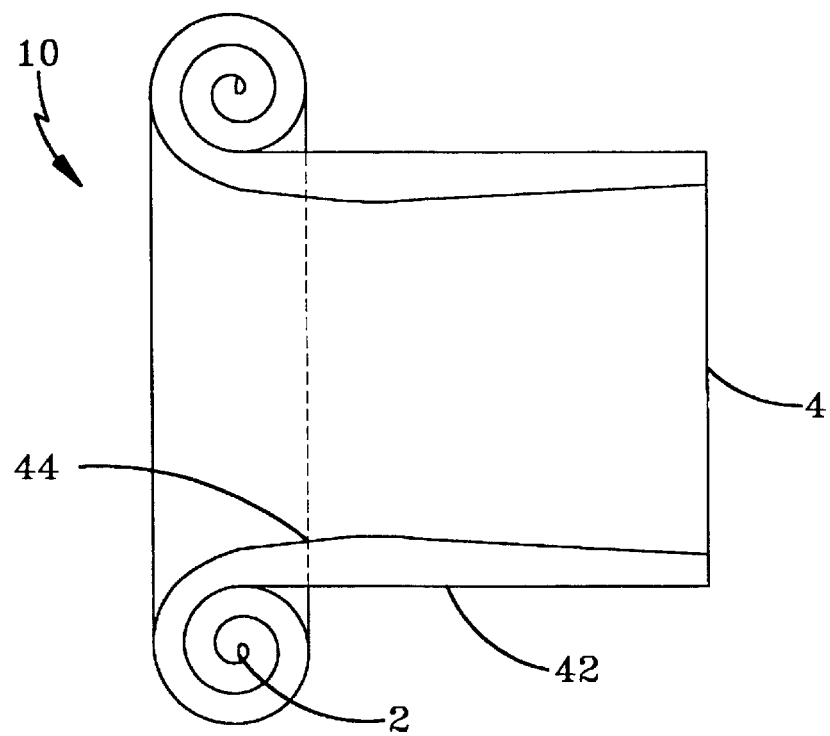
FIG. 2 is a cross-sectional view of the cylindrical innerliner (10) whereby the first end (2) is being rolled towards the second end (4)
Figure 3:
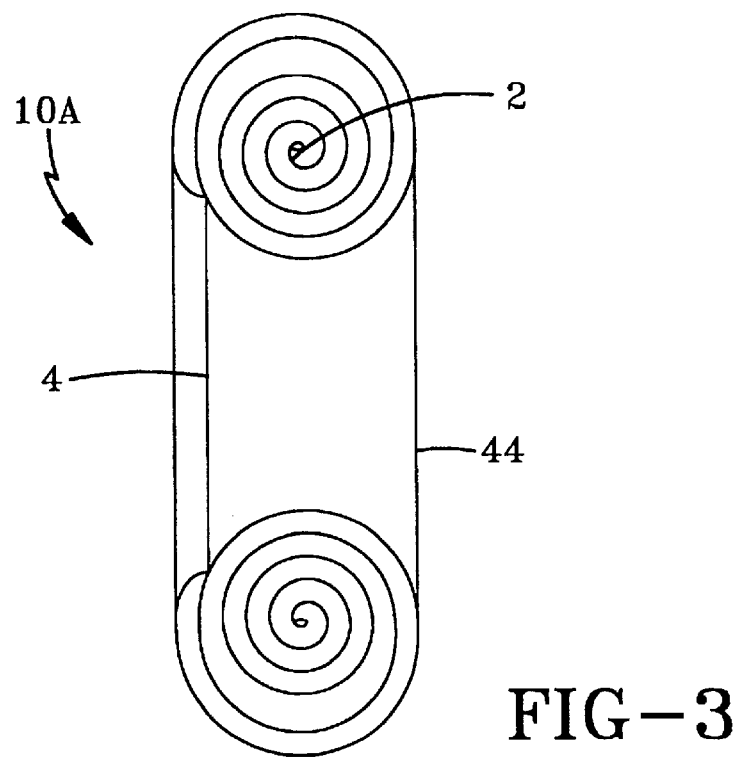
FIG. 3 is a cross-sectional view of the toroidally-shaped innerliner (10A)
Figure 4:
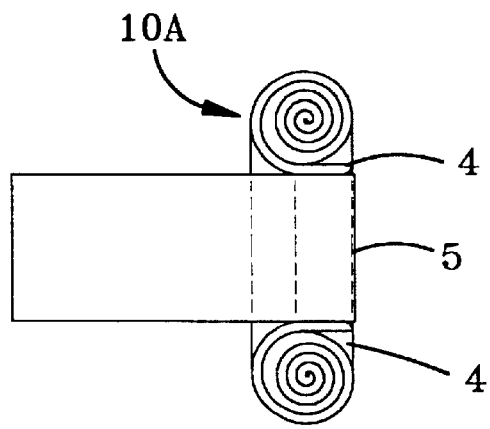
FIG. 4 is a view of the toroidally-shaped innerliner (10A) being placed on a building drum (5)
Figure 5:
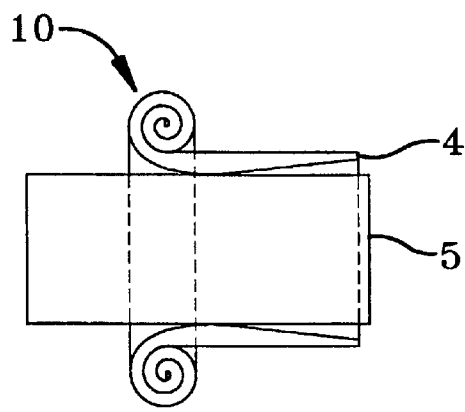
FIG. 5 is a cross-sectional view of the toroidally-shaped innerliner (10A) being unrolled onto the building drum (5)
Figure 6:
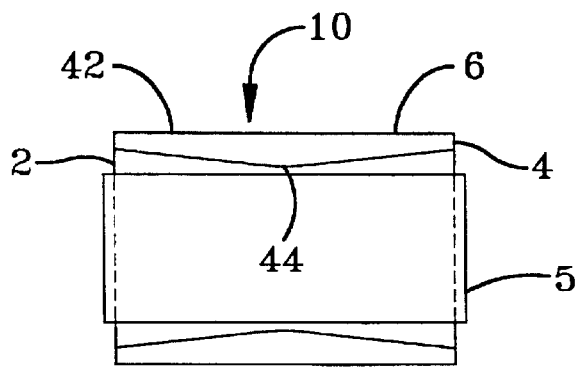
FIG. 6 is a cross-sectional view of the innerliner (10) unrolled and returned to its cylindrical shape on the building drum (5).
Figure 7:
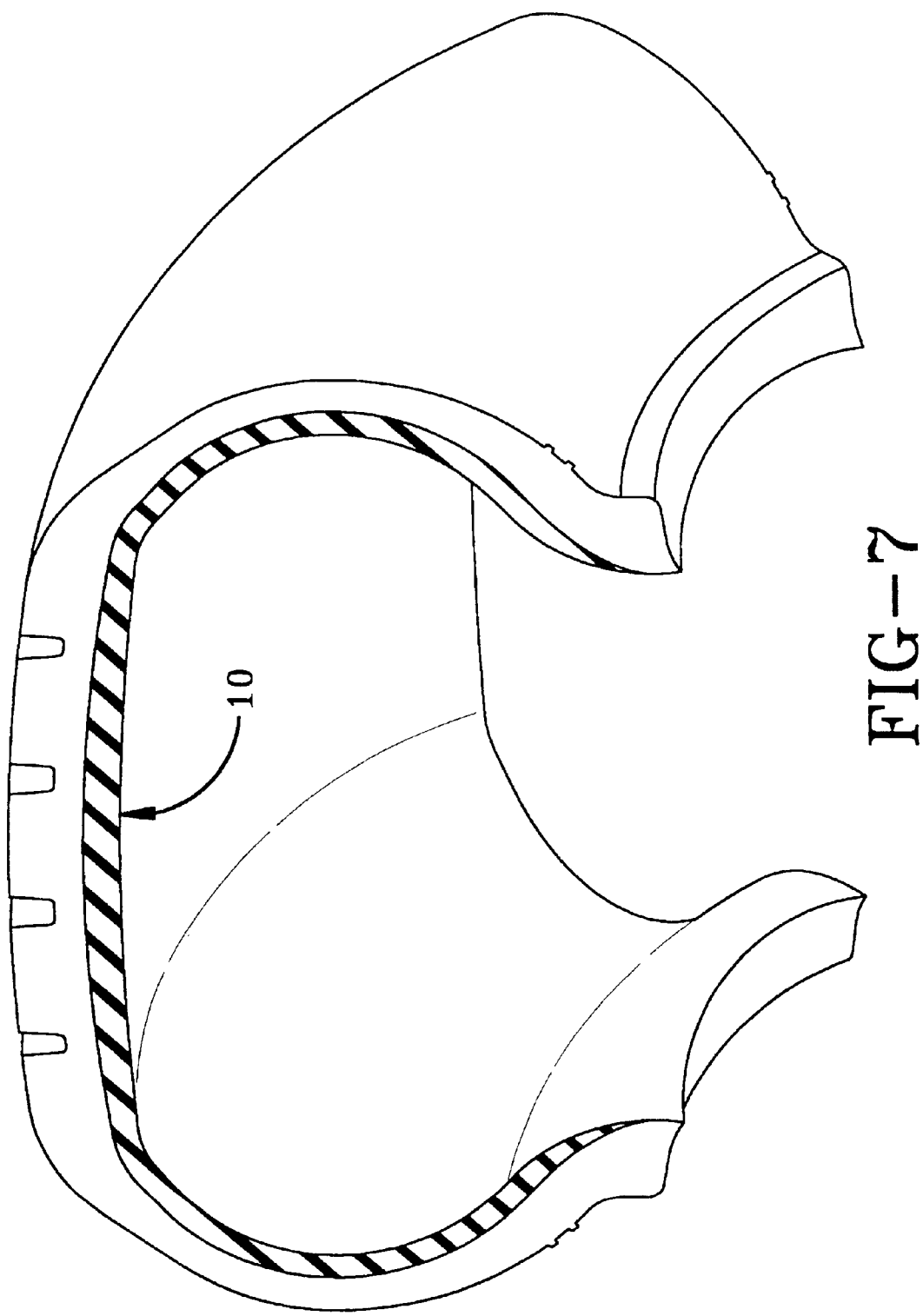
FIG. 7 is the innerliner (10) and its cured tire (1) shown in a partial perspective view of the cross-section and FIG. 7A is a cross-sectional view of the cured tire (1).
Figure 7A:
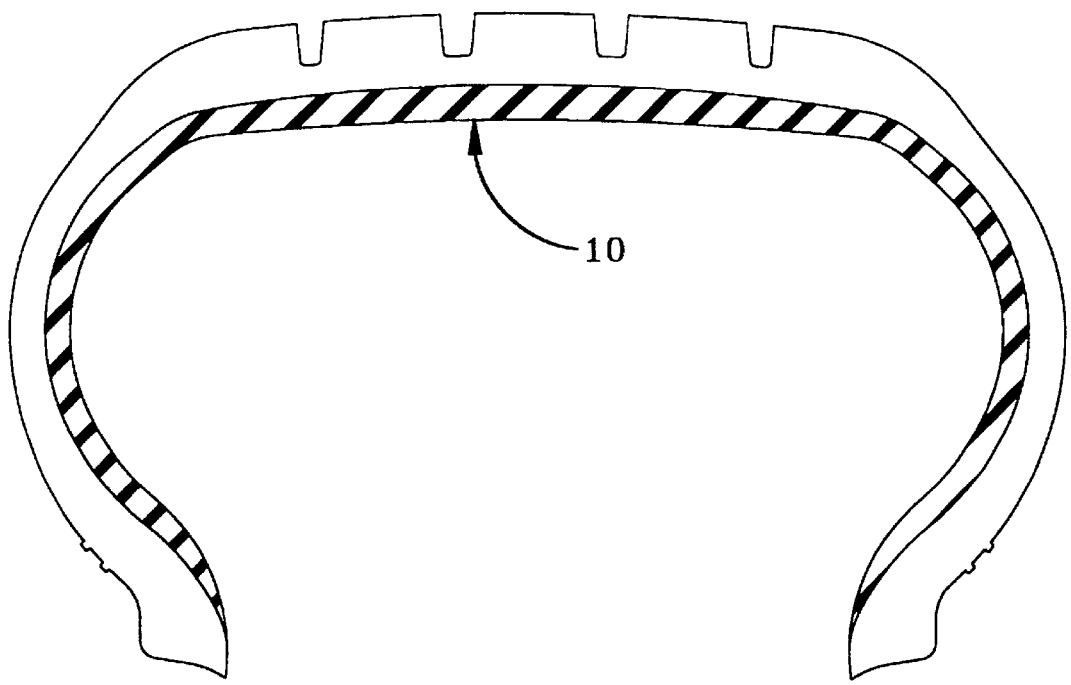

As shown in FIGS. 1 and 1a, the innerliner (10) of the present invention is formed of a splice-free, preferably at least partially vulcanized innerliner (10) shaped as, for example, with a cylindrical-shaped wall having a hollow-shaped radially inner surface (44). The wall thickness "X" of the innerliner (10) can be thicker at its center so that it is substantially uniform after the innerliner (10) is stretched and at least partially vulcanized in its approximate final shape. The innerliner (10) is typically manufactured from a curable rubber base material such as, for example, halobutyl rubber, and can be constructed by a number of different methods such as, for example, extrusion molding or injection molding.

As shown, the cylindrical-shaped innerliner has a first end (2) and a second end (4), a radially inner surface (44) and a radially outer surface (42) After its manufacture whether the innerliner is cured, uncured or partially cured, it has a large surface areas (42), (44) both internally and externally that is subject to contamination due to solvents, gases and particulate matter that can be found in any manufacturing facility. It is, therefore, desirable to minimize the exposure of the cylindrical innerliner (10) to dirt debris and oxidation potential.

While it is possible to minimize the exposure of the internal surfaces (44) simply by compressing the cylindrical innerliner into a flat shape, this somewhat compromises the design in that it creates bend or seam lines on the component creating stress risers in these locations. To minimize the occurrence of such a condition and also to accomplish a compact storage of cylindrical-shaped articles, the inventors of the present invention have conceived a novel method of converting the cylindrical shape into a solid toroidally-shaped member (10A). In order to do this, the first end (2) is rotated upon itself exposing the radially inner surface (44) as it is rotated. It is rotated until it completely traverses across the cylindrical innerliner (10) to the second end (4). Once this is accomplished, a somewhat spiral-shaped cross-section results as shown in the figure. The resultant shape (10A) appears to be a solid donut with only a small portion of the inner surface (44) of the innerliner (10) exposed as shown. The solid donuts are then stored for subsequent use in a tire building operation. When the innerliner (10) is needed for the assembly of a tire (1), it is placed over a building drop and the toroidally, solid-shaped donut (10A) is then unwound returning the innerliner (10) to its original cylindrical shape with a radially inner surface (44) adjacent the tire building drum (5) with the radially outer surface (42) exposed and awaiting tire components to be layered on top of it.

As can be seen from the construction, this method of shaping the cylindrical innerliner (10) into a toroidally-shaped donut (10A) of a solid construction creates a durable almost damage-free component. Because the components are substantially stretched in the process of forming the toroidally-shaped donut (10A), they are relaxed when they are returned to the cylindrical shape. In this manner, there are no unusual buckling or creases due to any storage mishandling. Furthermore, the component (10A) has very minimal surfaces exposed, and of those surfaces, only a small portion of the radially inner surface (42) has any exposure. This greatly enhances the adhesion characteristics of the vulcanized innerliner (10) to an unvulcanized casing. In fact, by converting the cylindrical shape to a toroidal shape shortly after curing, the lack of air exposure prevents the innerliner (10) from blooming or creating any other undesirable outgasing that may effect the performance of the innerliner (10) during its final vulcanization with the mated tire (1). It must be appreciated that the cylindrical innerliner (10) can comprise one or multiple layers of components It is necessary that such components, if laminated together, be capable of being rolled into the solid donut shape (10A). It is further understood that the cylindrical shape need not be of a constant cross-section, and in the preferred embodiment, has a cross-section slightly larger at the central portion.

Whether the innerliner (10) is converted to the solid donut shape (10A) shortly after being fabricated or alternatively stored flat until the time of assembly at that tire building drum (5), one of ordinary skill in the art of tire building will appreciate that a cylindrical shape already spliced or splice-less innerliner (10) is extremely difficult to stretch over an end of a tire building drum (5). First the drum (5) has a minimum gap between the drum end and the transversing bead setters and other equipment. Secondarily, the drum (5) has inflatable turnup and forming bladders of elastomeric material. This material makes it very difficult to slide a cylindrical component such as an innerliner (10) across the building drum (5). For these reasons, the conversion of the cylindrical-shaped innerliner (10) to a solid donut (10A) is extremely desirable if for no other reason as a means to facilitate locating the ends (2, 4) of the innerliner (10) precisely on the drum (5) and to simplify positioning the part over the drum. Therefore, the method of converting the innerliner (10) into a solid donut shape (10A) has great value if only used to facilitate the assembly procedure.

Figure 9:
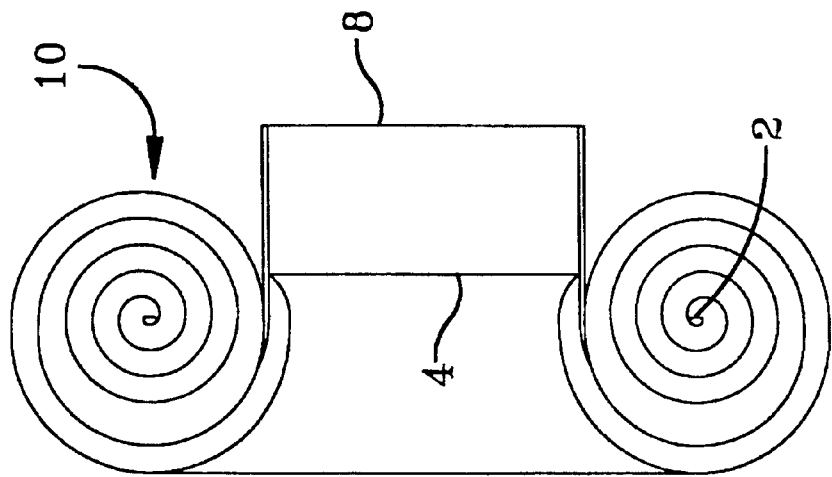
FIG. 9 is the alternative embodiment of FIG. 8 with a fabric (8) to protect the exposed end (4).
Figure 8:
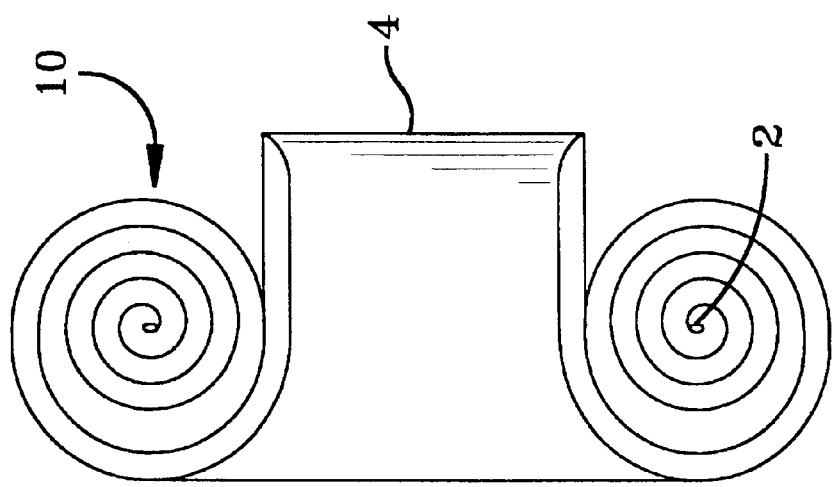
FIG. 8 is an alternative embodiment of the invention showing the solid toroidally-shaped innerliner with the second end extending cylindrically.

As shown in FIG. 8, a further alternative method of converting a cylindrical innerliner (10) into a solid donut (10A) includes the step of stopping the rotation just short of the second end (4) thereby forming a solid toroidal shape (10A) having a cylindrically exposed second end (4) extending from the inside diameter axially outwardly. This exposed end (4) provides a surface, which facilitates automated unwinding or unrolling of the innerliner (10) when positioning the innerliner (10) over the end of the tire building drum (5). To further protect the exposed end, a fabric (8) can be used at the second end (4) which can envelope the entire drought and, thereby, create the cylindrical end to facilitate unwinding the toroidally-shaped innerliner (10A) as shown in FIG. 9.

While the preferred innerliner (10) as shown has a maximum thickness at the center of the part, it is understood that the wall thickness can be of any particular size depending on the particular application.

While certain representative embodiments and details have been shown for the purpose of illustrating the invention, it will be apparent to those skilled in this art that various changes and modifications may be made therein without departing from the spirit or scope of the invention.

What is claimed is:

1. The method of preparing an innerliner (10) for storage and subsequent use in the manufacture of a tire (1), the innerliner (10) having a cylindrical shape having a first end (2), a second end (4) and a radially inner surface (44) and a radially outer surface (42), the method comprising the steps of rotating the first end (2) upon itself and continuing the rotation spirally traversing to the second end (4), thereby forming a solid toroidal shape (10A) having a portion of the radially inner surface (44) exposed.

2. The method of preparing an innerliner (10), of claim 1 further comprising the steps of placing the toroidally-shaped innerliner (10A) over a cylindrical building drum (5); and clamping said second end (4) while unrolling the innerliner (10) to the first end (2), the innerliner (10) being returned to a cylindrical shape with a radially inner surface (44) inward of the radially outer surface (42).

3. The method of preparing an innerliner (10) of claim 1 further comprising the step of applying a separation liner (6) to the innerliner outer surface (42) prior to rotating the first end (2).

4. The method of preparing an innerliner (10) of claim 1 further comprising the step of curing or partially curing the innerliner (10) prior to forming the toroidally-shaped innerliner (10A).

5. The method of preparing an innerliner (10) of claim 1 further including the step of placing the toroidally-shaped innerliner (10A) in an air impermeable container.

* * * * *